March 28, 1939. R. S. SANFORD 2,152,098
TRANSMISSION MECHANISM
Filed Sept. 27, 1935 2 Sheets-Sheet 2
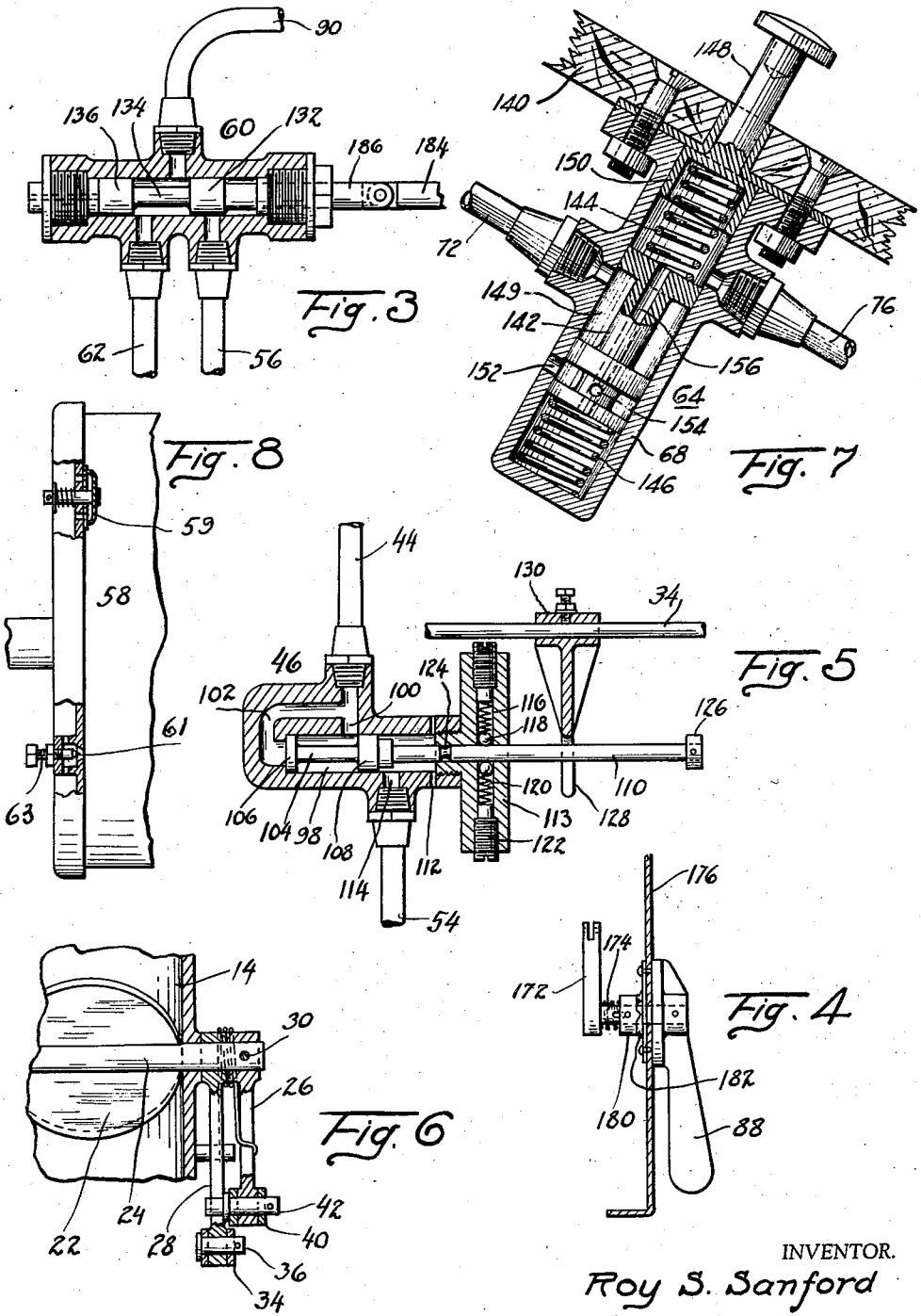
INVENTOR.
Roy S. Sanford
BY H. O. Clayton
ATTORNEYS.

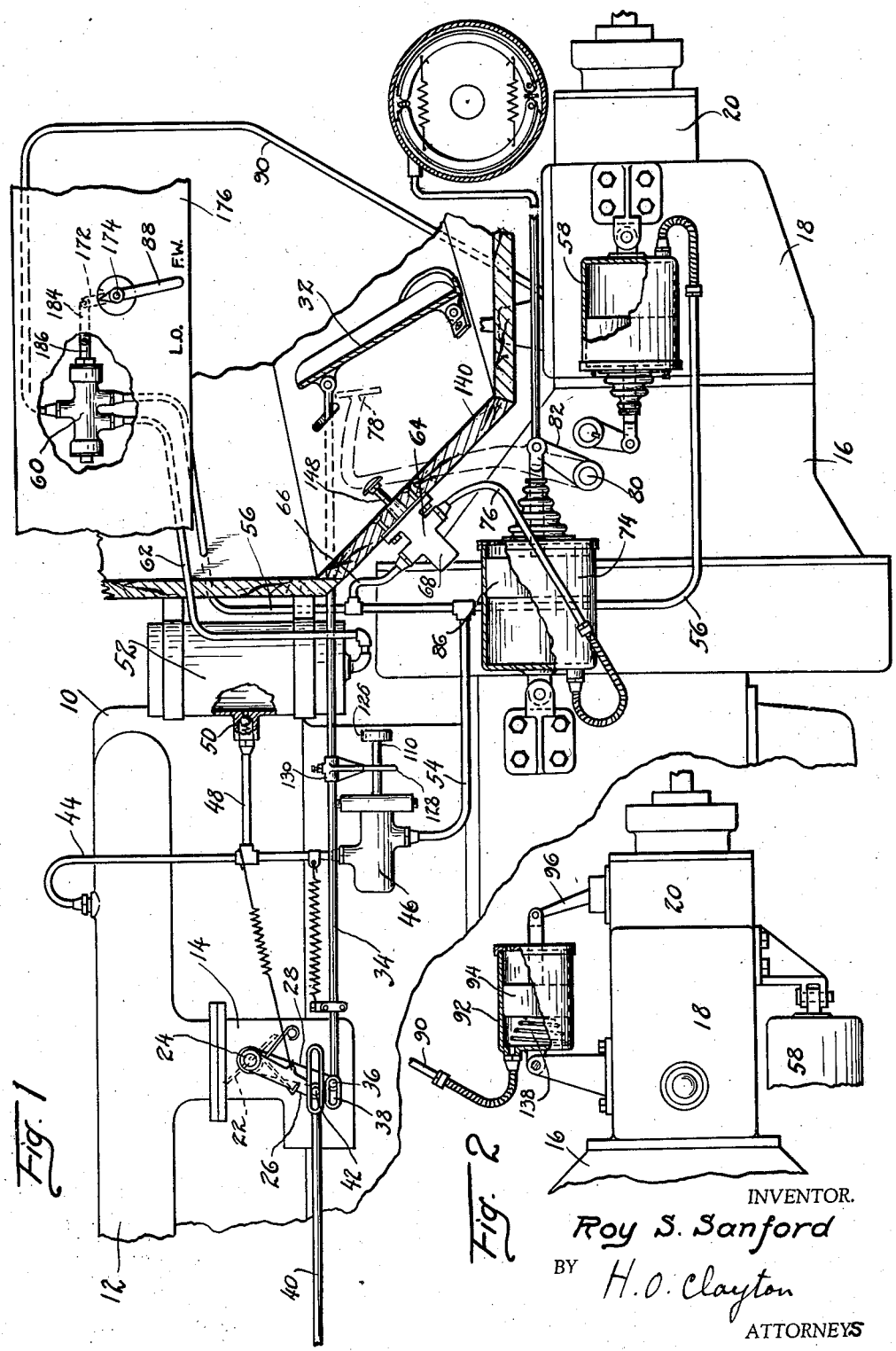

Patented Mar. 28, 1939

2,152,098

UNITED STATES PATENT OFFICE 2,152,098

TRANSMISSION MECHANISM

Roy S. Sanford, New York, N. Y., assignor to Bendix Products Corporation, South Bend, Ind., a corporation of Indiana Application September 27, 1935, Serial No. 42,420

2 Claims. (Cl. 192—.01)

My invention relates to vehicle control mechanism and has particular reference to the provision of power mechanism to facilitate manipulation of certain of the conventional control units customarily operated by hand.

An object of the invention is to utilize power available from the motor for the purpose of actuating certain control members of an automobile vehicle and to co-ordinate the power application to each of these controls in such manner that operation of one will automatically cause operation of the others involved in the system in proper timed relation.

More specifically, the invention relates to an automotive vehicle provided with brakes of any conventional type, an internal combustion engine operable to drive the vehicle through the customary clutch mechanism, and a free wheeling unit positioned rearwardly of the transmission in the customary manner.

One object of the invention is to utilize vacuum power from the intake manifold for the purpose of maintaining the free wheeling unit in free wheeling position when desired.

Another object relates to automatic operation of the clutch for gear shifting purposes through the vacuum available from the intake manifold of the engine and includes mechanism arranged to automatically throw the free wheeling unit from locked out position into free wheeling position when the drive shaft is de-clutched for gear shift purposes.

The advantage derived from unloading both ends of a transmission during the gear shifting operation is apparent. Such procedure eliminates all need for constant mesh gears in the transmission assembly and insures gear shifting without any clash whatsoever. A valve mechanism is so arranged that the engine is de-clutched automatically upon lifting the accelerator pedal and subsequently clutched upon depression thereof, at which time the free wheeling unit is locked out if the car is being operated at the time in that particular manner.

An important feature of the invention resides in the manner in which the same power source is rendered available for maintaining the said free wheeling unit in operative position or for automatically throwing the free wheeling unit into free wheeling position from locked out position during the declutching operation when the vehicle is being operated without free wheeling.

Another feature of the invention resides in the association of a vacuum brake applying mechanism with the other vacuum controlled mechanism in such a manner that the brakes may be applied to any desired degree whenever the accelerator pedal is released. Where maximum brake application is desired a manually operated brake control valve is pushed to the limit of its movement, at which point it will remain until the accelerator pedal is again depressed to shut off the vacuum lines from the source.

Fig. 1 is a side elevation, partly in section and somewhat diagrammatic, of the improved control system, Fig. 2 is a plan view of a portion thereof, Fig. 3 is a longitudinal section through the free wheeling control valve, Fig. 4 is a vertical section illustrating the manual control for said valve, Fig. 5 is a longitudinal section through the primary clutch control valve, Fig. 6 is a section through the carburetor butterfly valve and actuating mechanism therefor, Fig. 7 is a vertical section through the brake control valve assembly, and Fig. 8 is an elevation, partly in section, through one end of the clutch booster cylinder.

Referring now to Fig. 1 which is somewhat diagrammatic, particularly insofar as the conventional units of the automotive vehicle are concerned, the numeral 10 indicates an internal combustion engine provided with an intake manifold 12 to which is secured in conventional manner a carburettor 14. The conventional clutch housing is indicated at 16 at the rear of which is secured transmission assembly 18 and a free wheeling unit 20 is positioned rearwardly of the said transmission assembly.

The butterfly valve 22 of the carburettor is fixedly secured to shaft 24 and on the outer extremity of the said shaft are mounted the arms 26 and 28. Arm 26 is secured to the shaft 24 by means of pin 30 while the arm 28 is free to rotate about said shaft. The accelerator pedal 32 is connected through rod 34 with arm 28 through a lost motion connection formed by the pin 36 in the end of said arm 28 and the slot 38 at the extremity of rod 34. This lost motion connection permits movement of the clutch control valve without actuating the butterfly valve during initial depression of accelerator pedal 32.

The hand throttle is connected by rod 40 to the arm 26 through a similar lost motion connection utilizing a pin 42 in the extremity of said arm 26. This pin projects in front of arm 28 so that movement of the said arm to open the butterfly valve will necessarily move the arm 26 which is fixed to the shaft 24 to actuate the valve 22. Thus the accelerator movement will not force movement of the hand throttle.

A vacuum conduit 44 extends from the intake manifold 12 to the clutch control valve 46, a branch conduit 48 being connected through a one-way check valve 50 with an auxiliary vacuum tank supply 52. The clutch control valve 46 will be described more in detail hereinafter and is connected by conduit 54 to a conduit 56 which extends between a vacuum operating motor 58 and one port provided in the free wheeling control valve 60. Another conduit 62 provides communication between another port in the free wheeling control valve 60 and the vacuum tank 52. A brake control valve 64 is placed in fluid transmitting connection with the conduit 56 by means of a conduit 72.

Brake control valve 64, the detailed structure of which will be described more fully hereinafter, comprises a single cylinder 68 which communicates with conduit 56 through conduit 72 and with the brake vacuum booster cylinder 74 through conduit 76.

The brakes may be operated through the conventional brake pedal 78 which is pivoted as at 80 and provided with an arm 82 integral therewith to which the rod 84 leading to the brake system is secured. Piston 86 of the brake vacuum booster 74 is likewise secured to the arm 82.

The free wheeling control valve 60 may be manually set in either free wheeling or lock out position through a manually operable lever 88 and a vacuum conduit 90 extends from the control valve 60 to the vacuum operated cylinder 92, the piston 94 of which is connected to the arm 96 which is operable to throw the free wheeling unit 20 into or out of operative position.

Referring now more particularly to the clutch control valve 46, the main valve chamber 98 communicates directly with the vacuum conduit 44 through a port 100 and also through an auxiliary tortuous port 102. A slidable valve 104 is positioned in the main valve chamber, which valve is of the spool type, including the valve heads 106 and 108 at opposite extremities thereof. The valve is mechanically actuated by the valve stem 110 which extends out through the valve casing, the said casing being vented to the atmosphere as at 112. A port 114 provides communication between the valve chamber 98 and the conduit 54.

The open end of the valve casing is closed by a threaded closure member 113 through which the valve stem 110 extends. This closure member is provided with a transverse bore 116 in which are positioned balls 118 which are adapted to seat against the valve stem and, which are urged yieldingly thereagainst by means of springs 120 which are seated against the threaded members 122. The pressure exerted against the valve stem by the balls may be adjusted as desired through the threaded members 122. Valve stem 110 is provided with notches 124 into which balls 118 are adapted to seat for the purpose of creating a temporary stop against sliding movement of valve 104 for reasons to be hereinafter brought out. The exposed extremity of the valve stem 110 is provided with a head 126 against which the depending portion 128 of bracket 130 is adapted to abut when the accelerator pedal is in its fully released position. Bracket 130 is secured to accelerator rod 34.

In the drawings, Figures 1 and 5, the accelerator 32 and its associated parts have been illustrated in partly depressed position and the valve 104 is retained in the position illustrated in Figure 5 through the vacuum existing on the left side of the valve head 108. In this position it will be apparent that the conduit 54 is closed to vacuum and the clutch motor 58 will remain in inoperative position as illustrated in Figure 1, the engine being clutched with the drive shaft.

When the accelerator pedal 32 is released the bracket 130 will abut the head 126 to withdraw the valve 104 to the extreme right hand limit of its movement at which point the port 114 will be open into the vacuum line 44. The vacuum will then be transmitted through the conduit 54 to the vacuum motor 58 whereupon the booster will operate to de-clutch the engine. Under these circumstances the vacuum will also operate through the other end of conduit 56 which opens into the free wheeling lock out control valve 60. In Figure 3 this control valve has been shown in the free wheeling position wherein the head 132 of the spool valve 134 closes the valve chamber from any vacuum in conduit 56, but provides communication by reason of the position of valve head 136 between conduit 90 and conduit 62 which is in communication with the auxiliary vacuum supply tank 52. If the control handle 88 were set at locked out position communication between conduit 56 and conduit 90 extending to the free wheeling motor 92 would be available and the piston 94 of the said free wheeling motor would operate against spring 138 to pull the mechanical throw out lever 96 into free wheeling position as indicated in the drawings. It is therefore apparent that when the accelerator pedal 32 is released, assuming the free wheeling control to be set in locked out position, the vacuum from the intake manifold will operate to simultaneously de-clutch the engine from the transmission and throw the free wheeling unit 20 into free wheeling position. In this way both ends of the transmission 18 are relieved of any load whatsoever and gear shifting may be accomplished without clash of any kind regardless of the speed of the vehicle.

Where the free wheeling control valve 60 is set as indicated in the drawings for continuous free wheeling operation, a constant vacuum is maintained in conduit 62 and through the conduit 90 to retain the piston 94 of the free wheeling motor cylinder 92 in free wheeling position against the spring 138.

The operation on release of the accelerator being clear, it will be apparent that when the accelerator is again depressed the operations heretofore explained having taken place the valve 104 of the clutch control valve 46 will move to its extreme leftwardly position when the vacuum created on the left thereof is sufficient to pull the valve 104 out of engagement with the check balls 118 thus closing the vacuum from the clutch motor 58 and the free wheeling booster 92. The spring tension against the check balls may be adjusted as desired through threaded members 122 so that they will release after any predetermined vacuum is built up in the lines. Thus a predetermined vacuum must be built up in the various cylinders before the valve 104 can shut off port 114. This insures complete disengaging movement of the clutch and full operation of the free wheeling unit.

Referring now to Fig. 7, brake control valve 64, secured in any desired manner beneath floor boards 140, includes a cylinder 68 in which a spool valve 142 is slidably received. This spool valve is balanced as indicated between two coil springs 144 and 146. Coil spring 144 is the stronger of the two and upon depression of the stem 148 said spool valve will be actuated without compressing the spring 144, which is seated at its upper extremity within an annular flange 150 integral with stem 148. The valve is illustrated in Fig. 7 in its normal inoperative position. The conduits 72 and 76 open into the valve casing as indicated and the spool valve 142 is provided with an axial bore 156 which communicates with a transverse bore 154 opening into an annular groove as indicated. In its normal inoperative position the groove and transverse bore 154 are adapted to register with an air vent 152 in the wall of the valve casing.

Upon depression of the stem 148 by the operator the air vent 152 will at first be closed to communication with the axial bore 156 and the upper head of the spool will subsequently open the line 72 to communication with line 76 which extends to the brake motor cylinder 86. After vent 152 has been so closed, continued depression of stem 148 will again open it to communication with the intermediate space 149 between the heads of spool valve 142. When the vacuum created in the upper portion of the casing 68 is sufficient to overcome the strength of spring 144 the spool valve 142 will move upwardly to again close off communication between vacuum line 72 and 76 without however venting the cylinder 86 to the air via the vent 152. The valve is then in what is known as a lapped position. It will therefore be apparent that the degree of brake application secured through the motor cylinder 86 is directly dependent upon the extent to which the stem 148 is depressed, such depression governing the compression under which the spring 144 must be placed before beginning venting the brake motor cylinder to air through the vent 152.

The manually operable mechanism for actuating the free wheeling control valve 60 has been illustrated in Fig. 4 and includes an arm 172 secured to a shaft 174, which shaft is rotatably journalled in the dash panel 176. The manually operable lever 88 is secured to the other extremity of shaft 174 and a clutch member 180 is splined to the shaft 174 by means of a pin and slot connection. The clutch member 180 is normally urged into engagement with a corresponding clutch member 182 fixedly positioned on the dash panel 176. In this manner the arm 172 is retained in either of its two positions. Arm 172 is pivotally connected to a link 184 which is in turn connected to the stem 186 of the spool valve 134.

The elevation of the clutch motor 58 in Fig. 8 illustrates in section the one way spring controlled valve 59 which vents the cylinder to air as the vacuum is placed in communication with the other end of the cylinder. The adjustable valve 61 may be manipulated through the threaded valve stem 63 to control the exhaust of air on released movement of the clutch booster piston.

While certain preferred structural features have been illustrated in conjunction with the automatic power control mechanism described herewith it will be apparent that the scope of the invention extends beyond the illustrated embodiments and for that reason I wish to be limited only by the appended claims.

What I claim is:

1. In an automotive vehicle provided with an accelerator, wheel brakes and a clutch, power means for operating said brakes and clutch comprising a pressure differential operated motor operably connected with the clutch, a separate pressure differential operated motor operably connected with the brakes, and valve mechanism for controlling the operation of said motors including a valve for controlling the brake operating motor and an accelerator operated valve operable, upon release of the accelerator, to effect an energization of the clutch operating motor to disengage the clutch and to make possible an energization of the brake operating motor with an operation of its aforementioned control valve.

2. In an automotive vehicle provided with two separate sources of power, an accelerator, a clutch and a free-wheeling unit, the clutch and free-wheeling unit being positioned ahead of and to the rear of the transmission of the vehicle respectively and comprising in combination therewith power means for operating the clutch and free-wheeling unit including a pressure differential operated motor operably connected to the clutch, a pressure differential operated motor operably connected to the free-wheeling unit, a fluid transmitting connection extending from one of said power sources, two separate fluid transmitting connections in parallel with each other, one of said connections interconnecting said first-mentioned fluid transmitting connection and the clutch operating motor and the other of said connections interconnecting said first-mentioned connection and the free-wheeling unit operating motor, a selector valve incorporated in the aforementioned connection leading to the free-wheeling unit operating motor, said valve being operable either to interconnect said latter motor with said first-mentioned connection or to interconnect said motor with one of said aforementioned power sources, and an accelerator operated valve incorporated in said first-mentioned connection operable, upon release of the accelerator, to energize the aforementioned clutch operating motor and to energize the free-wheeling operating motor when the selector valve is in one of its controlled positions.

ROY S. SANFORD.